US012780342B2

(12) United States Patent
Marchetta et al.

(10) Patent No.: US 12,780,342 B2
(45) Date of Patent: Nov. 3, 2026

(54) MOTORCYCLE WITH ACTIVE AERODYNAMICS

(71) Applicant: PIAGGIO & C. SPA, Pontedera (IT)

(72) Inventors: Francesco Marchetta, Pontedera (IT); Marco Lambri, Pontedera (IT)

(73) Assignee: PIAGGIO & C. SPA, Pontedera (IT)

(*) Notice: Subject to any disclaimer, the term of this patent is extended or adjusted under 35 U.S.C. 154(b) by 278 days.

(21) Appl. No.: 18/281,851

(22) PCT Filed: Mar. 1, 2022

(86) PCT No.: PCT/IB2022/051788
§ 371 (c)(1),
(2) Date: Sep. 13, 2023

(87) PCT Pub. No.: WO2022/195387
PCT Pub. Date: Sep. 22, 2022

(65) Prior Publication Data

US 2024/0149966 A1 May 9, 2024

(30) Foreign Application Priority Data

Mar. 15, 2021 (IT) ........................ 102021000006029

(51) Int. Cl.
*B62J 17/10* (2020.01)
*B62J 17/04* (2006.01)

(52) U.S. Cl.
CPC ............... *B62J 17/10* (2020.02); *B62J 17/04* (2013.01)

(58) Field of Classification Search
CPC .................................. B62J 17/10; B62J 17/04
See application file for complete search history.

(56) References Cited

U.S. PATENT DOCUMENTS 4,010,976 A * 3/1977 Shields .................... B62J 17/02 296/78.1
4,606,571 A * 8/1986 Fujita ....................... B62J 17/04 296/89

(Continued)

FOREIGN PATENT DOCUMENTS

CN 104527861 A 4/2015
CN 107364518 A 11/2017

(Continued)

OTHER PUBLICATIONS

International Search Report for corresponding application PCT/IB2022/051788 filed Mar. 1, 2022; Mail date Sep. 19, 2022.

(Continued)

*Primary Examiner* — Jonathan Malikasim
(74) *Attorney, Agent, or Firm* — CANTOR COLBURN LLP

(57) ABSTRACT

A motorcycle (1) comprising a fairing (2) at least partially covering the frame (3) of the motorcycle (1), said fairing (2) comprising two movable portions (4) arranged on the right and left side of the motorcycle (1), respectively; each of said movable portions (4) being configured to move between a rest position in which said movable portion (4) is arranged inside a pocket (5) of the fairing (2) so as to be coplanar with the fairing (2) itself, and an open position in which a back edge (6) of said movable portion (4) is laterally detached from said fairing (2); wherein said movable portions (4) of the fairing (2) are arranged in an upper portion of the motorcycle arranged above the center of gravity (G) of the motorcycle (1).

17 Claims, 3 Drawing Sheets

(56) References Cited

U.S. PATENT DOCUMENTS

| | | | | | |
|---|---|---|---|---|---|
| 4,911,494 | A | 3/1990 | Mai et al. | | |
| 6,293,606 | B1 * | 9/2001 | Jarosz | B62J 17/04 | 296/78.1 |
| 8,042,640 | B2 * | 10/2011 | Namiki | B62K 11/04 | 180/219 |
| 8,517,449 | B2 * | 8/2013 | Okubo | B62J 17/10 | 296/78.1 |
| 8,777,291 | B2 * | 7/2014 | McNeely | B62J 17/04 | 296/78.1 |
| 9,216,789 | B2 * | 12/2015 | Hamlin | B62J 15/02 | |
| 10,766,557 | B2 | 9/2020 | Tetsuka | | |
| 12,227,253 | B2 * | 2/2025 | Kramer | B62J 17/04 | |
| 2011/0233956 | A1 | 9/2011 | Okubo | | |
| 2023/0348006 | A1 * | 11/2023 | Weinelt | B62J 17/10 | |

FOREIGN PATENT DOCUMENTS

| | | | | |
|---|---|---|---|---|
| DE | 3420352 | A1 * | 12/1985 | B62J 17/00 |
| DE | 102006020670 | A1 | 11/2007 | |
| EP | 0685385 | A1 | 12/1995 | |
| EP | 1514782 | A2 | 3/2005 | |
| EP | 1514782 | B1 * | 11/2008 | B62J 17/02 |
| EP | 3190034 | A1 | 7/2017 | |
| JP | 641671 | A | 1/1989 | |
| JP | H01301483 | A | 12/1989 | |
| JP | 2002087354 | A | 3/2002 | |
| JP | 2015182734 | A | 10/2015 | |
| WO | WO-2008088809 | A2 * | 7/2008 | B62J 25/04 |
| WO | 2017169325 | A1 | 10/2017 | |
| WO | 2020095166 | A1 | 5/2020 | |

OTHER PUBLICATIONS

Written Opinion for corresponding application PCT/IB2022/051788 filed Mar. 1, 2022; Mail date Sep. 19, 2022.

Japanese Office Action for corresponding application 2023-556814, Report dated Jun. 22, 2026.

* cited by examiner

MOTORCYCLE WITH ACTIVE AERODYNAMICS

TECHNOLOGICAL FIELD

The present invention relates to the field of motorcycles with two or three rolling wheels.

BACKGROUND ART

Motorcycles comprising movable portions to deflect air away from the driver are known from the prior art.

An example of this is provided by patent EP1514782. In this solution, fins coplanar with the fairing of the vehicle and arranged in front of the vehicle open to deflect air from the rider's legs.

This solution deflects air from the rider's legs, while the part of the rider's body which is most sensitive to air is the torso or head.

At high speeds, the air on the rider's torso or head can interfere with driving. Indeed, at high speeds, riders are forced to duck, placing their torso almost in contact with the tank and their head behind the front windshield. Thereby, the turbulence and disturbance created by air friction on the body are minimized. Conversely, this position, in addition to being uncomfortable, is highly dangerous because it allows low maneuverability of the vehicle and poor front visibility.

Moreover, solutions in which the front windshield is movable are also known from the prior art. One solution if this type is provided by patent U.S. Pat. No. 10,766,557 in which a movable windshield deflects air past the rider's head.

This solution allows partially solving the problem mentioned above, deflecting air away from the rider's head but not from the torso. Therefore, this aspect does not allow for a comfortable ride at high speeds for the rider.

Known solutions from the prior art are not available in order to avoid the aforesaid drawbacks and allow a better driving position and a higher driving comfort, even at high speeds.

SUMMARY

The aforesaid drawbacks of the prior art are now solved by a motorcycle comprising a fairing at least partially covering the frame of the motorcycle, where said fairing comprises two movable portions arranged on the right and left side of the motorcycle, respectively. Each of said movable portions is configured to move between a rest position, in which said movable portion is arranged within a fairing pocket so as to be coplanar with the fairing itself, and an open position, in which a back edge of said movable portion is laterally detached from said fairing. Said movable portions of the fairing are entirely arranged in an upper portion of the motorcycle arranged above the center of gravity of the motorcycle. Thereby, air is diverted laterally by the movable portions of the fairing, and the arrangement thereof in the upper part of the vehicle contributes to diverting the airflow away from the rider's torso and only marginally from his/her legs.

The movable portions of the present invention are moved at the same time and are symmetrically actuated so that both take either the rest positions or the open positions.

The relative terms rear, front, upper, lower, lateral refer to the directions identified by the vehicle following the direction of normal orientation of a motorcycle arranged vertically on a flat ground and not laterally inclined or steered.

Advantageously, said movable portions can be rotatably connected to said fairing by one or more hinges. Said hinges can have rotation axes oriented vertically or inclined towards the front of the motorcycle. Thereby, the movable portions open at an angle with respect to the fairing.

Preferably, said one or more hinges can be arranged close to the front edge of said movable portions. Thereby, the movable portions open at an angle, maintaining the front edge of said movable portions substantially coplanar with said fairing.

In particular, said movable portions can be arranged beside a motorcycle tank. Since the tank is normally the highest element of a motorcycle, said movable portions are arranged in the highest portion of the vehicle. This position is particularly favorable for deflecting air from the rider's torso.

Preferably, said movable portions can be arranged at least partially under the handlebar of the motorcycle. In this position, it is highly difficult for the driver's legs to collide with these movable portions, thus reducing the risk of damage to the vehicle.

Advantageously, each of said movable portions can be concave in shape. The bottom of the concavity can extend longitudinally in a front-to-back direction of the motorcycle. This specific shape of the movable portions allows the airflow deflected by the movable portions to be channeled, while concentrating it in a specific direction.

Preferably, a portion of said fairing arranged in front of said movable portion can be shaped with a concavity coplanar with the concavity of said movable portion so as to create an air channel which extends longitudinally on the vehicle. This air channel provides the dual effect of deflecting air around the tank when the movable portions are in said rest position and contributing to the diversion laterally when said movable portions are in said open position.

Advantageously, said motorcycle can comprise an actuation apparatus configured to move each of said movable portions between said rest position and said open position. Thereby, the operation of the movable portions is not manual.

In particular, said actuation apparatus can comprise a first actuator of the irreversible type connected to the fairing and the movable portion, either directly or by means of a mechanism. This solution allows reducing the force that the actuator must apply because the mechanism is used to demultiply the resistant force applied by the air to the movable portions at high speeds. Furthermore, the actuator, being of the irreversible type, does not require continuous actuation when the movable portions reach the open position. The term "irreversible actuator" means an actuator capable of moving to various operating positions and maintaining each of said operating positions without needing to continue actuating the actuator once said operating position is reached.

Preferably, said motorcycle can comprise a control unit operatively connected to said first actuator and at least one speed sensor operatively connected to said control unit. Said control unit can be configured to control said first actuator as a function of the vehicle speed detected by said at least one speed sensor. Thereby, the movable portions open as a function of speed, increasing their deflection effect as a function of the wind speed resulting from the advancement of the motorcycle.

In particular, said control unit can be configured to control the movement of said movable portion from said rest position to said open position upon exceeding a predetermined speed threshold. This allows opening the movable portions when the speed is above a threshold considered no longer comfortable for driving.

Advantageously, said motorcycle can comprise a movable windshield connected to a front portion of the motorcycle by means of an articulated parallelogram configured to allow a vertical movement of the windshield with respect to the front portion of the motorcycle between a rest position, in which the windshield is close to the fairing, and an open position, in which the windshield is detached upwards from the fairing. This movable windshield allows deflecting air past the rider's head and shoulders, thus helping, along with the movable portions of the fairing, to remove as much air as possible from the rider at high speeds. The term "windshield" means a windscreen of small size or a front fairing portion, either partially or totally transparent, which is separated from the rest of the fairing.

In particular, said motorcycle can comprise a second actuator of the irreversible type connected to the frame and a portion of said articulated parallelogram. Thereby, when the second actuator is actuated, the articulated parallelogram moves the movable windshield and the effort made by the actuator is less, resulting in a lower cost thereof.

Preferably, said motorcycle can comprise a selector arranged on a handlebar of the motorcycle configured to control the vertical movement of said movable windshield. Optionally, the motorcycle rider could want to raise the windshield regardless of speed, such as during a rainy or very cold day.

These and other advantages will become more apparent from the following description of an embodiment thereof, merely given by way of an indicative non-limiting example, with reference to the accompanying drawings.

DETAILED DESCRIPTION

Figure 1A:
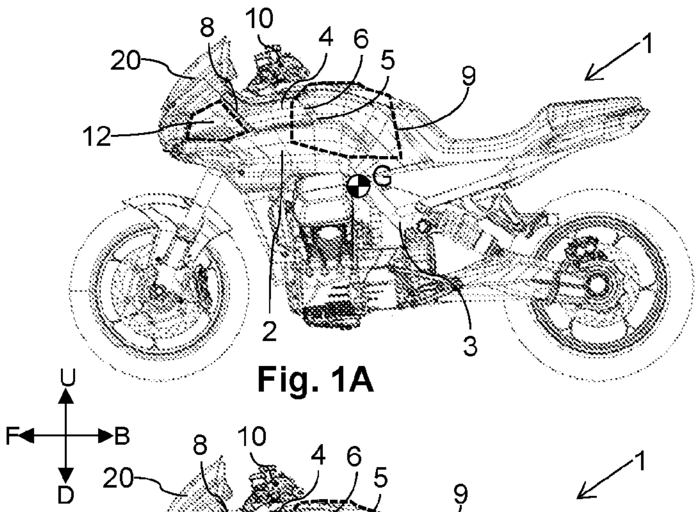
FIG. 1A shows a side view of the motorcycle according to the present invention in which both the movable portions of the fairing and the windshield are in the rest position.

The following description of one or more embodiments of the invention relates to the accompanying drawings. The same reference numerals in the drawings identify equal or similar elements. The object of the invention is defined by the appended claims. The technical details, structures, or features of the solutions described below can be combined with one another in any manner.

With reference to FIGS. 1-4, a motorcycle 1 is shown, equipped with a fairing 2 adapted to cover part of the frame 3 and other internal components of the motorcycle 1, such as the cleaner box, the engine control unit, and various other components not shown in FIGS. 1-4 since covered by the fairing 2. The fairing 2 can also partially or completely cover the engine.

The motorcycle 1 depicted in FIGS. 1-4 is a typical motorcycle comprising an internal combustion engine, motion transmission components from the engine to the rear wheel, a steering front wheel, a frame which supports the vehicle components, as well as typical elements which make a motorcycle 1 comfortable, such as a seat, footrests, and a handlebar. This brief description of the vehicle serves indicatively to clarify that the present invention relates to rideable saddle vehicles of the two-wheeled type. Alternatively, the vehicle at issue can also have an electric motor and thus a battery instead of the tank or three wheels instead of two.

For the purpose of the present invention, all figures are provided with Cartesian reference axes adapted to indicate the front, back, right side, left side, top, and bottom of the motorcycle 1. Such directions also serve as a reference for positioning the elements of motorcycle 1 or portions thereof. The terms "motorcycle" or "vehicle" can be used as alternatives having the same meaning within the text.

Figure 1B:
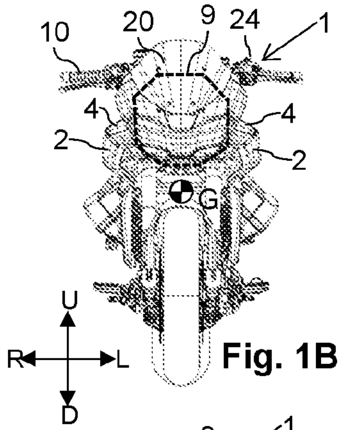
FIG. 1B shows a front view of the motorcycle according to the present invention in which both the movable portions of the fairing and the windshield are in the rest position.
Figure 6A:
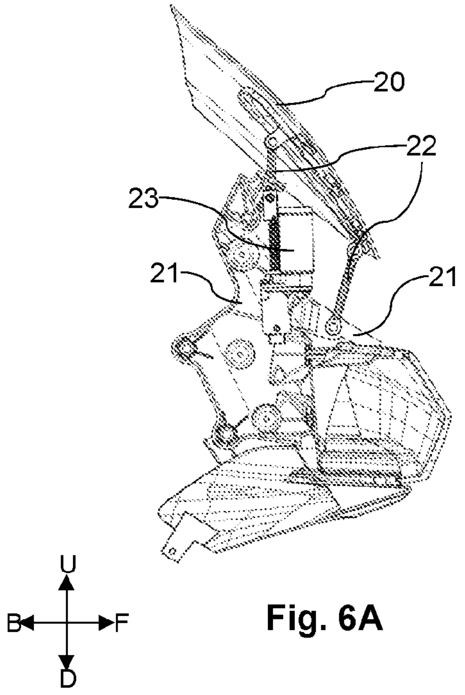
FIG. 6A shows a sectional side view of the front of the motorcycle, with particular reference to the windshield and the movement mechanism thereof, in which the windshield is in the open position.
Figure 6B:
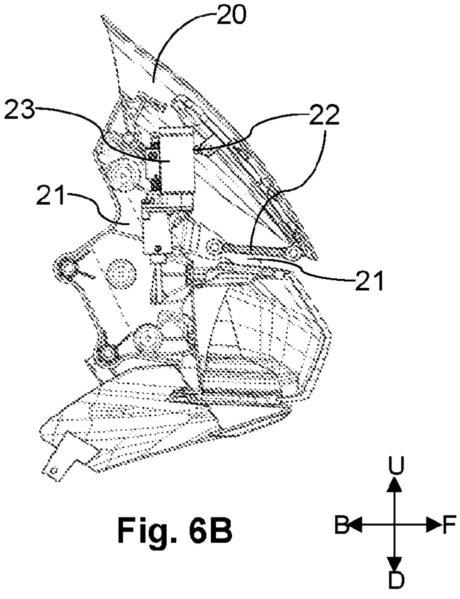
FIG. 6B shows a sectional side view of the front of the motorcycle, with particular reference to the windshield and the movement mechanism thereof, in which the windshield is in the rest position.

The figures are numbered consecutively and can comprise suffixes if they indicate different views or different implementation positions. For example, the two FIGS. 1, i.e., FIGS. 1A and 1B, depict the same motorcycle 1, in the same operating condition, but seen from the side and front, respectively; conversely, the two FIGS. 6, i.e., FIGS. 6A and 6B, depict the front of the motorcycle 1 in two different operating positions of the windshield 10.

The term "rest position" or "closed position" are used as alternatives having the same meaning within the text.

Figure 3A:
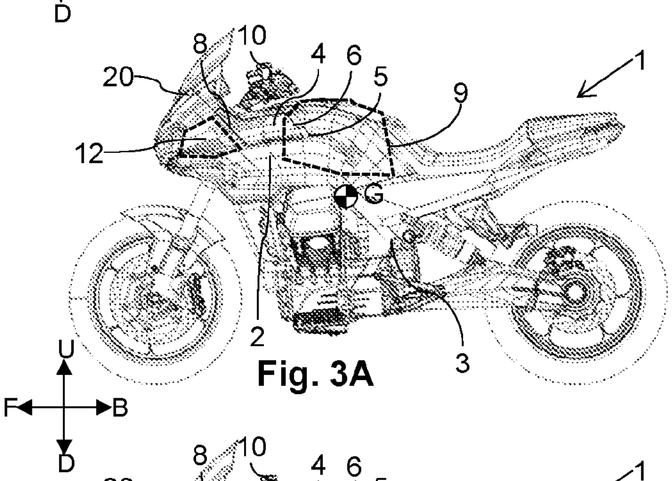
FIG. 3A shows a side view of the motorcycle according to the present invention in which the movable portions of the fairing are in the rest position and the windshield is in the open position.
Figure 3B:
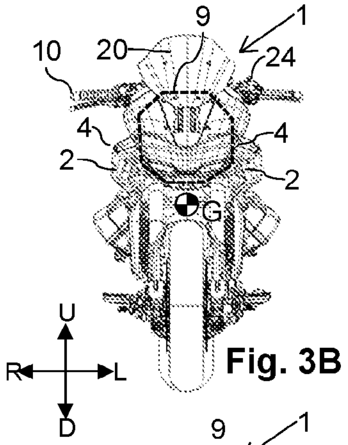
FIG. 3B shows a front view of the motorcycle according to the present invention in which the movable portions of the fairing are in the rest position and the windshield is in the open position.
Figure 4A:
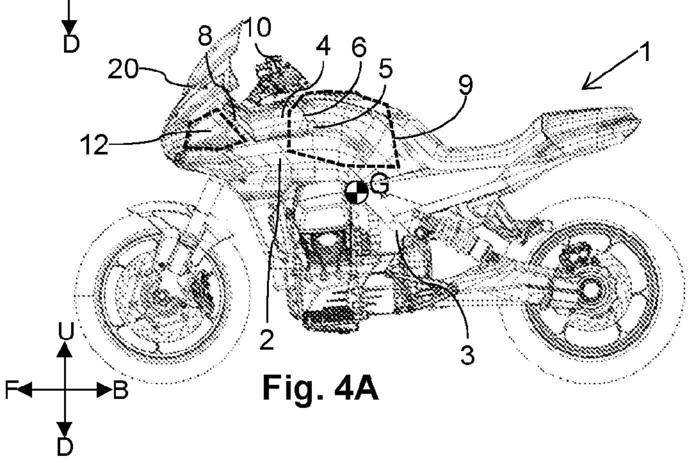
FIG. 4A shows a side view of the motorcycle according to the present invention in which both the movable portions of the fairing and the windshield are in the open position.
Figure 4B:
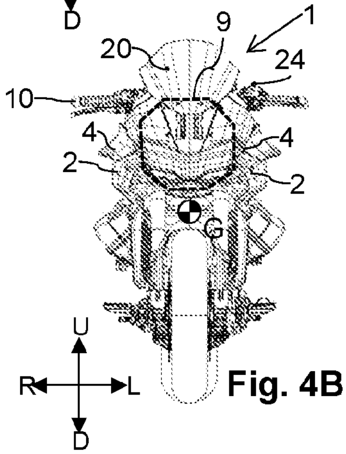
FIG. 4B shows a front view of the motorcycle according to the present invention in which both the movable portions of the fairing and the windshield are in the open position.

On the respective right and left sides, said fairing 2 comprises movable portions 4 which can move with respect to the fairing 2. These movable portions 4 can move from a rest position as shown in FIGS. 1 and 3, to an open position as shown in FIGS. 2 and 4.

The motorcycle 1 can further comprise a windshield 20 which is configured to move with respect to the fairing 2. In particular, the windshield 20 can take an open position as shown in FIGS. 3 and 4 and remain in the rest position, as shown in FIGS. 1 and 2.

Figure 2A:
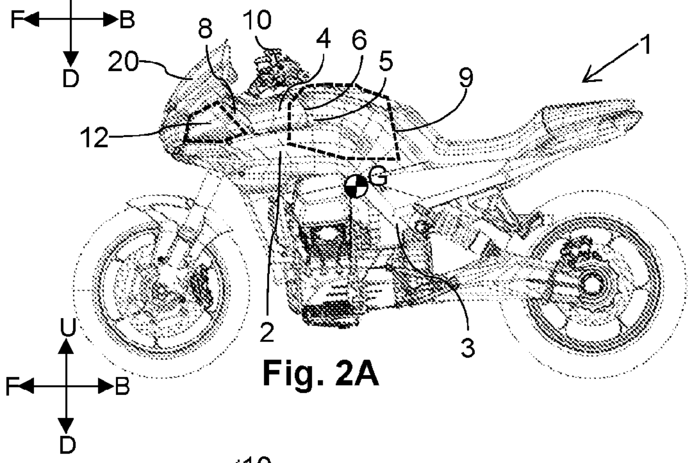
FIG. 2A shows a side view of the motorcycle according to the present invention in which the movable portions of the fairing are in the open position and the windshield is in the rest position.
Figure 2B:
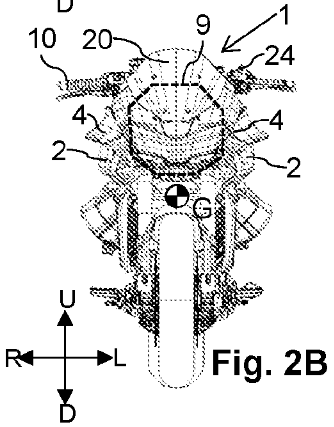
FIG. 2B shows a front view of the motorcycle according to the present invention in which the movable portions of the fairing are in the open position and the windshield is in the rest position.

As better clarified below, the movable portions 4 can move regardless of the movement of the windshield, as shown in FIG. 2. The same obviously applies to the windshield 20 which can move irrespective of the movable portions 4, as shown in FIG. 3. Both the windshield 20 and the movable portions 4 can also take the open position, as shown in FIG. 4. Alternatively, both the movable portions 4 and the windshield 20 can maintain a closed position, as shown in FIG. 1.

In the rest position, the movable portions 4 of the fairing 2 are substantially coplanar with the fairing 2 so that the fairing is substantially continuous. In this position, the movable portions 4 appear as closed hatches of the fairing 2.

Figure 9A:
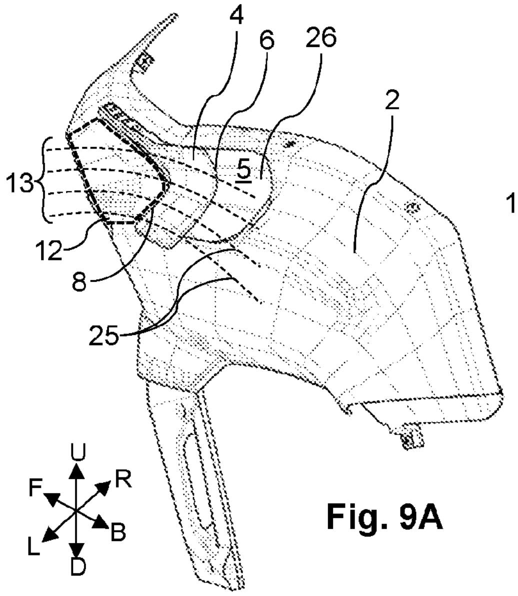
FIG. 9A shows an axonometric view of the outer side of the fairing, in which the movable portion on the left is in the open position.
Figure 9B:
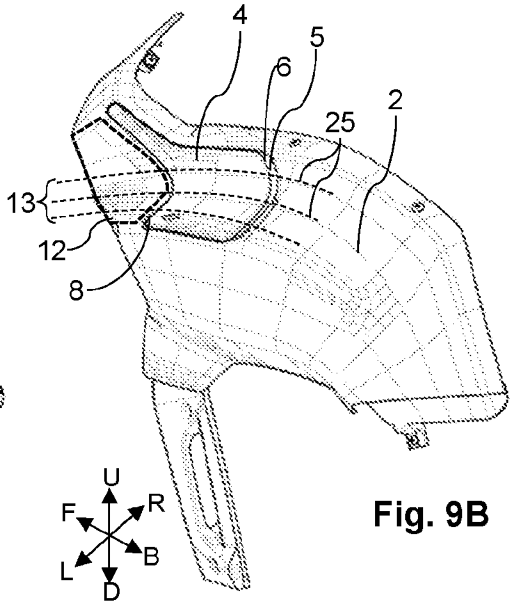
FIG. 9B shows an axonometric view of the outer side of the fairing, in which the movable portion on the left is in the rest position.

Therefore, the airflow which laps the fairing 2 when the movable portions 4 are in the closed position is not disturbed by the latter, as shown in FIG. 9B.

In the open position, the movable portions 4 of the fairing 2 are partially laterally spaced outwards. Thereby, the airflow which laps the motorcycle 1 when advancing is diverted laterally and partially upwards.

Figure 5:
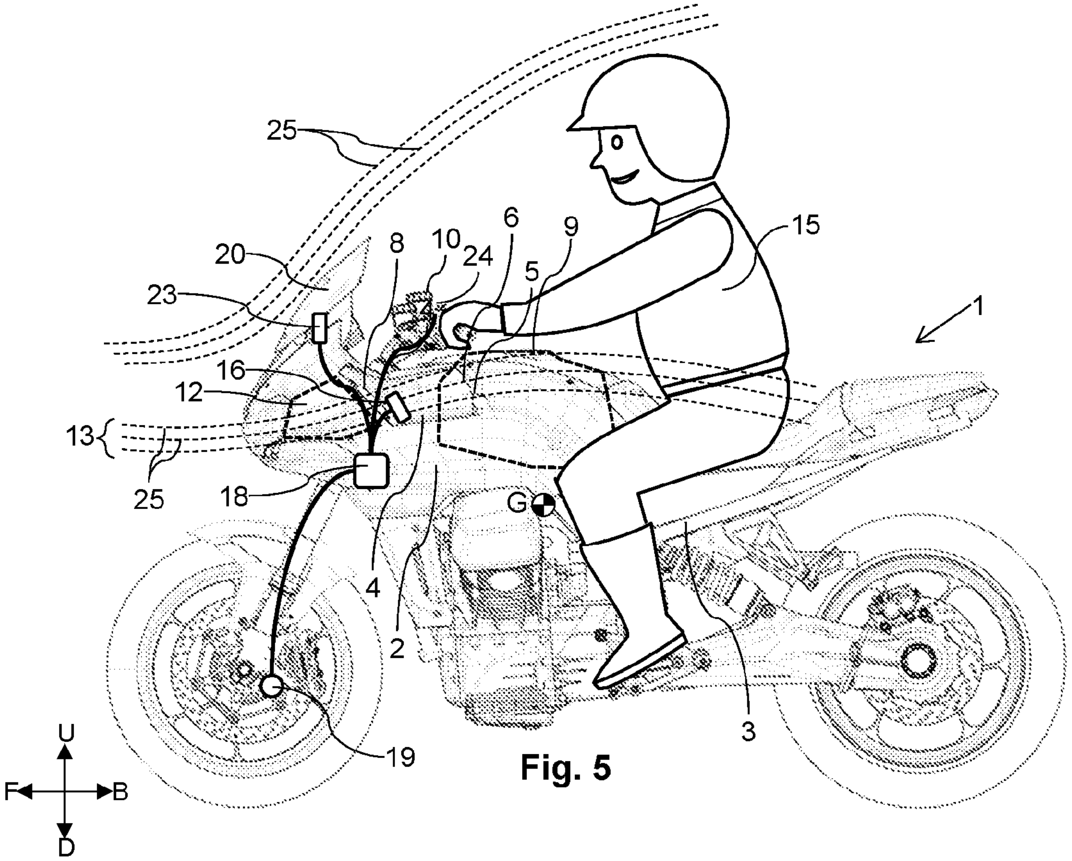
FIG. 5 shows a side view of the motorcycle and the related rider according to the present invention in which both the movable portions of the fairing and the windshield are in the open position.

As shown in FIG. 5, when in the open position, the movable portions 4 divert the airflow, depicted by flow lines 25 to the side of the torso of rider 15. The driving comfort is thus increased, especially at high speeds.

Furthermore, FIG. 5 shows that the windshield 20, when in the open position, diverts the airflow upward past the head of rider 15.

These two aerodynamic contributions allow greatly improving the driving comfort for the rider 15, especially at high speeds and especially if simultaneously used.

Figure 7:
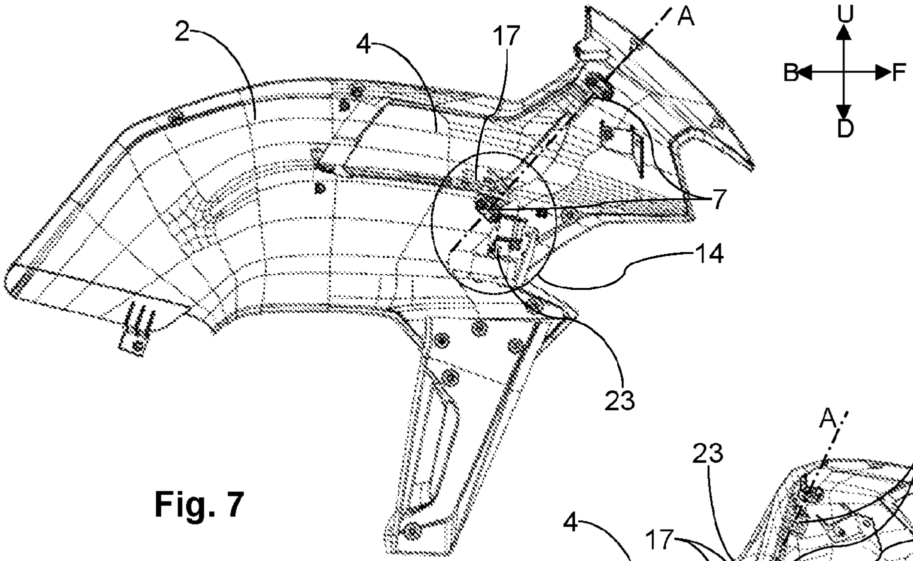
FIG. 7 shows a side view of the inner side of the fairing, in which the movable portion on the left is in the rest position.
Figure 8:
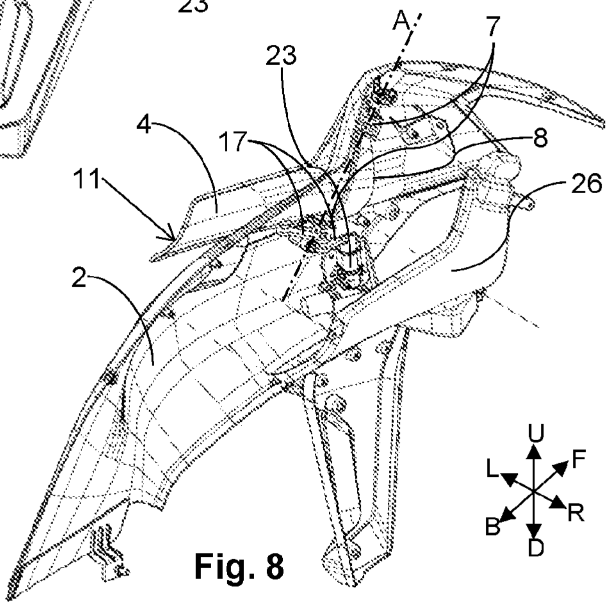
FIG. 8 shows an axonometric view of the inner side of the fairing, in which the movable portion on the left is in the open position.

The movable portions 4 are inclined with respect to the fairing 2 in order to divert the airflow laterally. In essence, they rotate around hinges 7 which are arranged behind the movable portions 4 as shown in FIGS. 7 and 8, and change the angle of the movable portion 4 with respect to the fairing 2.

The movable portions are hinged to the rest of the fairing 2 by means of hinges 7 arranged close to the front edge 8. Thereby, when the movable portion 4 opens, the front edge 8 substantially remains in the same position, i.e., close to the fairing 2, while the back edge 6 moves away from the fairing 2. In essence, the movable portions 4 move like the gills of a fish.

When the back edge 6 of the movable portions 4 is spaced apart from the fairing 2, the flow which laps the front portion 12 of the fairing is laterally diverted by the movable portions 4 and detaches from the fairing 2, moving laterally away outwards.

The movable portions 4 are arranged at the top of the motorcycle 1 so as to deflect air from the torso of rider 15.

In particular, the movable portions 4 are arranged above the center of gravity of the vehicle without rider 15 and fuel. Indeed, this portion of the motorcycle 1 is one of the highest parts thereof and the one closest to the torso of rider 15, as shown in FIGS. 1-5.

Furthermore, the movable portions 4 are arranged next to the tank 9, in particular if the motorcycle 1 is observed frontally as in FIGS. 16,26,36,46. As shown in FIGS. 1-5, the tank 9 (depicted in a dotted line) is in front of the belt of rider 15, as is normally the case on almost all known motorcycles. This position is particularly favorable for deflecting air from the torso of rider 15. For this reason, the movable portions 4 are preferably arranged in this position.

The movable portions 4 are preferably arranged under the handlebar 10. This position is particularly advanced and thus optimal to intercept the airflow which laps the front portion 12 of the motorcycle 1 to deflect it laterally.

The movable portions 4 are shaped so as to follow the contour of the fairing 2 when these are in the rest position.

In particular, the movable portions 4 shown in FIG. 9 as well as in the other figures, are concave in shape, thus allowing better conveying the airflow. The concavity extends on the movable portion 4 so that the bottom 11 of the concavity, i.e., the most depressed portion of the movable portion 4, is arranged in a longitudinal direction. The concave shape of the movable portions 4 behaves like a tube cut in half lengthwise, thus allowing the flow lines 25 to be channeled and grouped together to create an air channel 13. This air channel 13 can thus be diverted more or less outwards depending on the inclination of the movable portions 4.

In FIG. 9B, it can be seen that the movable portion 4 groups the flow lines 25 and allows them to lap the fairing 2. The air channel 13 is thus tangent to the outer surface of the fairing 2.

In FIG. 9A, on the other hand, it can be seen that the flow lines 25 are grouped by the movable portion 4 and diverted away, thus detaching from the back of the fairing 2.

The bottom 11 of the concavity is oriented, when observing the motorcycle 1 from the side, according to a front-to-back direction, and is inclined upwards at the rear. This orientation of the bottom 11 allows deflecting the flow lines 25 not only outwards, but also upwards. The shape of the concavity and the bottom 11 thereof can be perceived by observing the orientation of the construction lines of the movable portions 4 in FIGS. 1A, 2A, 3A, 4A, 5.

The front portion 12 of the fairing 2 is also shaped with a concavity, so as to facilitate the formation of air channel 13. This concavity is continuous and coplanar with the movable portions 4 when they are in the closed position. The concavity of the front portion 12 of the fairing 2 is also shaped so that a detachment of the fluid streamline of air lapping the fairing 2 is not created when the movable portions 4 are in said open position.

The movable portion 4 has a complementary shape to the pocket 5 of the fairing 2, as shown in FIG. 9B. The fairing 2 comprises an inner cover 26 which allows obtaining said pocket 5, which would otherwise be a through-hole in the fairing 2. This cover 26 allows preventing the interior of fairing 2 from being accidentally accessed with a hand when the movable portion 4 is in the open position.

As shown in FIG. 8, the actuation apparatus 14 of the movable portion 4 is also arranged inside the cover 26. The actuation apparatus 4 is the means by which the movable portion 4 switches from the closed position to the open position.

The actuation apparatus 14 comprises a first actuator 16 of the irreversible type. In the example in FIG. 8, the first actuator 16 is a rotary actuator provided with an arm rotatably connected to a connecting rod, in turn, rotatably connected to the inner surface of the movable portion 4. The arm together with the connecting rod form the mechanism 17.

In order to be irreversible, the first actuator 16 comprises a helical worm screw therein, which cooperates with a toothed wheel kinematically connected to an electric motor. The pitch of the worm screw is conveniently chosen in order to create sufficient friction between the worm screw and the toothed wheel, such as to make the first actuator 16 irreversible when the electric motor is not powered. Thereby, the movable portions 4 remain in the open position even if the electric motor is not powered. Alternative embodiments of the actuation apparatus 14 are possible. For example, the actuation apparatus can comprise an oil-hydraulic piston actuated by a pump and connected to the pump by means of a valve. When the valve is closed, the piston thus retains the extension thereof and keeps the movable portion 4 in the open position.

As best shown in FIG. 5, the first actuator 16 is operatively connected to a control unit 18. Preferably, this control unit 18 is the same as that of the vehicle. Furthermore, the control unit 18 is operatively connected to a speed sensor 19.

The control unit 18 is configured to receive a signal from the speed sensor 19 and process it so as to output a control signal for the first actuator 16. This output signal is processed based on the speed read by the speed sensor 19. Said speed sensor 19 can be the phonic wheel sensor of the anti-lock braking system (ABS) of the vehicle 1, for example.

The control unit 18 is configured to actuate the first actuator 16 if the speed exceeds a predetermined threshold, such as 100 km/h. When said predetermined threshold is exceeded, the control unit 18 sends a control signal to the first actuator 16 to open the movable portions 4 which then switch from said closed position to said open position.

Said control unit 18 can also be connected to a second actuator 23 of the windshield 20.

The windshield 20, as previously mentioned, is configured to move up and down with respect to the fairing 2 upon the actuation of an actuation system. The system at issue comprises a mechanism consisting of an articulated parallelogram 22 and a second actuator 23, as shown in FIG. 6.

The articulated parallelogram 22 consists of a pair of upper connecting rods, only one of which is seen in FIGS. 6A,6B since they are sectional views, and a pair of lower connecting rods, only one of which is seen in FIGS. 6A,6B since they are sectional views. The windshield 20 itself, which is hinged to said upper and lower connecting rods, and a front portion of the frame 21, to which opposite ends of said upper and lower connecting rods are hinged, contribute to complete the articulated parallelogram 22. The articulated parallelogram 22 thus conceived allows the upward and downward roto-translation of the windshield 20. Alternative forms of movement of the windshield 20 are also possible, for example the windshield 20 can be moved along a track which is integral with the front portion of the frame 21 by a stepper motor or a piston.

The front portion of the frame 21 depicted in FIG. 6 is a component rigidly connected to the steering head of the motorcycle 1, which in turn is integral with and forms an integral part of the frame 3. Said parallelogram is connected to a second actuator 23 which, when extending, allows deforming said articulated parallelogram 22 and moving the windshield 20.

Specifically, the second actuator 23 comprises an electric motor and a worm screw coming out of the motor, as shown in FIG. 6A. The upper end of said worm screw is connected to an element of the articulated parallelogram 22. In particular, said worm screw is connected to said upper connecting rods. When said second actuator 23 extends, the upper connecting rods rotate and are inclined upwards, thus raising the windshield 20. The lower connecting rods allow substantially keeping the same inclination as the windshield 20, as seen in FIG. 6A in which the windshield 20 is in the open position.

The second actuator 23 is operatively connected to said control unit 18. Said control unit 18 is configured to actuate simultaneously the first actuator 16 and the second actuator 23 when said predetermined speed threshold is reached or exceeded.

In this case, the control unit 18 processes a dual control signal and sends it to both the first actuator 16 and the second actuator 23. Thereby, both the movable portions 4 of the fairing 2 and the windshield 20 move to said open position.

Moreover, said control unit 18 can be operatively connected to a selector 24 arranged on the handlebar. By means of said selector 24, the rider 25 can control the height of the windshield 20 regardless of speed. Thereby, the control of the height of the windshield 20 is independent of whether or not the movable portions 4 are operated. Furthermore, by means of said selector 24, the rider 15 can further select the height, i.e., a position which can be said open position or an intermediate position between said open position and said rest position.

In conclusion, it is apparent that the invention thus conceived is susceptible to several modifications or variations, all falling within the invention; moreover, all details are replaceable by technically equivalent elements. In practice, the quantities could be changed depending on the technical needs.

KEY

1 Motorcycle
2 fairing
3 frame
4 movable portion
5 pocket
6 back edge of movable portion
7 hinge
8 front edge of movable portion
9 tank
10 handlebar
11 movable portion concavity
12 front fairing portion in front of the movable portion
13 air channel
14 actuation apparatus
15 rider
16 first actuator
17 mechanism
18 control unit
19 speed sensor
20 windshield
21 front frame portion
22 articulated parallelogram
23 second actuator
24 selector
25 flow lines
26 fairing cover

The invention claimed is:

1. A motorcycle comprising a fairing at least partially covering a frame of the motorcycle, said fairing comprising two movable portions respectively arranged on the right and left side of the motorcycle; each of said movable portions being configured to move between a rest position in which said movable portion is arranged inside a pocket of the fairing so as to be coplanar with the fairing itself, and an open position in which a back edge of said movable portion is laterally detached from said fairing; wherein said movable portions of the fairing are entirely arranged in an upper portion of the motorcycle arranged above the center of gravity of the motorcycle.

2. The motorcycle according to claim 1, wherein each of said movable portions is rotatably connected to said fairing by means of one or more hinges having axes of rotation oriented vertically or inclined towards the front of the motorcycle.

3. The motorcycle according to claim 2, wherein said one or more hinges are arranged in proximity to a front edge of said movable portions.

4. The motorcycle according to claim 3, wherein said movable portions are arranged beside a tank of the motorcycle.

5. The motorcycle according to claim 3, wherein said movable portions are at least partially arranged under a handlebar of the motorcycle.

6. The motorcycle according to claim 1, in which each of said movable portions has a concave shape, and the bottom of the concavity extends longitudinally in a front-to-back direction of the motorcycle.

7. The motorcycle according to claim 6, wherein a portion of said fairing arranged in front of said movable portion is shaped with a concavity coplanar with the concavity of said movable portion so as to provide an air channel which extends longitudinally.

8. The motorcycle according to claim 1, comprising an actuation apparatus configured to move each of said movable portions between said rest position and said open position.

9. The motorcycle according to claim 8, wherein said actuation apparatus comprises a first actuator of the irreversible type connected to the fairing and to the movable portion directly or by means of a mechanism.

10. The motorcycle according to claim 9, comprising a control unit operatively connected to said first actuator and at least one speed sensor operatively connected to said control unit, wherein said control unit is configured to control said first actuator as a function of the speed detected by said at least one speed sensor.

11. The motorcycle according to claim 10, wherein said control unit is configured to control the movement of said movable portion from said rest position to said open position upon exceeding a determined threshold of speed.

12. The motorcycle according to claim 11, comprising a second actuator of the irreversible type connected to said front portion and to a portion of said articulated parallelogram.

13. The motorcycle according to claim 12, wherein said control unit is configured to simultaneously control the movement of said first actuator and said second actuator from said rest positions at said open positions upon exceeding said determined speed threshold.

14. The motorcycle according to claim 12, wherein said control unit is configured to simultaneously control the movement of said first actuator and said second actuator from said rest positions at said open positions upon exceeding said determined speed threshold.

15. The motorcycle according to claim 1, comprising a windshield connected to a front portion of the frame by means of an articulated parallelogram configured to allow vertical movement of the windshield with respect to said front portion between a rest position, in which the windshield is close to the fairing, and an open position, in which the windshield is detached upwards from the fairing.

16. The motorcycle according to claim 15, comprising a selector arranged on a handlebar of the motorcycle configured to control the vertical movement of said windshield.

17. A motorcycle comprising a fairing at least partially covering a frame of the motorcycle, said fairing comprising two movable portions respectively arranged on the right and left side of the motorcycle; each of said movable portions being configured to move between a rest position in which said movable portion is arranged inside a pocket of the fairing so as to be coplanar with the fairing itself, and an open position in which a back edge of said movable portion is laterally detached from said fairing; wherein said movable portions of the fairing are arranged in an upper portion of the motorcycle arranged above the center of gravity of the motorcycle; the motorcycle also comprising an actuation apparatus configured to move each of said movable portions between said rest position and said open position, a control unit operatively connected to a first actuator of the actuation apparatus and at least one speed sensor operatively connected to said control unit, wherein said control unit is configured to control said first actuator as a function of the speed detected by said at least one speed sensor.

* * * * *